United States Patent [19]

Ahmed et al.

[11] Patent Number: 5,209,192
[45] Date of Patent: May 11, 1993

[54] TWO-CYCLE ENGINE

[75] Inventors: Afif Ahmed, Bailly; Bertrand Hauet, Carrieres sur Seine, both of France

[73] Assignee: Regie Nationale des Usiness Renault, Boulogne-Billancourt, France

[21] Appl. No.: 786,515

[22] Filed: Nov. 1, 1991

[30] Foreign Application Priority Data

Nov. 2, 1990 [FR] France ................... 90 13620

[51] Int. Cl.$^5$ .................. F02B 33/04; F02B 75/02
[52] U.S. Cl. ................... 123/65 PE; 123/323
[58] Field of Search ............. 123/65 PE, 65 P, 315, 123/323

[56] References Cited

U.S. PATENT DOCUMENTS

| | | | |
|---|---|---|---|
| 2,401,858 | 6/1946 | Clark | 123/65 PE |
| 4,426,967 | 1/1984 | McWhorter | 123/315 |
| 4,541,371 | 9/1985 | Kageyama et al. | 123/190 A |
| 4,920,932 | 5/1990 | Schlunke | 123/65 PE |
| 4,969,330 | 11/1990 | Groff et al. | 123/65 PE |
| 4,998,512 | 3/1991 | Masuda et al. | 123/65 PE |
| 5,107,801 | 4/1992 | Huang | 123/65 PE |
| 5,111,778 | 5/1992 | Huang | 123/65 PE |

FOREIGN PATENT DOCUMENTS

| | | |
|---|---|---|
| 0278191 | 8/1988 | European Pat. Off. . |
| 0339969 | 11/1989 | European Pat. Off. . |
| 3933105 | 4/1990 | Fed. Rep. of Germany ... 123/65 PE |
| 63-186908 | 8/1988 | Japan ..................... 123/65 PE |
| 1016545 | 5/1983 | U.S.S.R. ................ 123/65 PE |

*Primary Examiner*—David A. Okonsky
*Attorney, Agent, or Firm*—Oblon, Spivak, McClelland, Maier & Neustadt

[57] ABSTRACT

Two-cycle engine with fuel injection, of the type having at least one cylinder (3) in which a piston (5) is mounted to slide. A crankshaft is connected to this piston and housed in a housing (2), cylinder (3) further communicating with an intake circuit with pressurized combustion air (7) by at least one intake orifice (17) placed in the vicinity of the bottom dead center of the piston and with a circuit for exhaust of the combustion gases. The exhaust circuit comes out in cylinder (3) by at least two exhaust orifices: a first orifice (18) placed approximately at the level of the intake orifice (17) and a second orifice (19) placed above the first.

12 Claims, 1 Drawing Sheet

TWO-CYCLE ENGINE

BACKGROUND OF THE INVENTION

This invention relates to two-cycle internal combustion engines intended in particular to equip motor vehicles and it relates in particular to the circuit for exhaust of used combustion gases to be mounted on such engines.

The internal combustion engines most often used to equip the vehicles operate according to a four cycle: intake by a valve of the air-fuel mixture, followed by its compression, then by its expansion after combustion and finally exhaust of the burnt gases by a second valve.

In a two-cycle engine, the piston rises toward a top dead center position compressing the gases in the cylinder. Then, the combustion takes place and the released energy is recovered in the downward movement of the piston. The intake and exhaust times are generally controlled by the piston which moves past the intake and exhaust ports, located in the body of the cylinder near the bottom dead center: first, the exhaust port making it possible for the burnt gases to begin to escape, then the intake port feeding the cylinder pressurized "fresh air". These fresh gases are used to scavenge the burnt gases toward the exhaust. As a result, a part of the fresh gases are lost to the exhaust when the fuel is simultaneously introduced to the fresh gases, more than 25% from the fuel introduced in the combustion chamber does not burn and is directly rejected with the exhaust gases into the atmosphere. An extensive pollution results from this, on the order of ten to twenty times greater than that of a four-cycle engine.

New techniques have been developed to respond to the problem of fuel losses by exhaust. Instead of jointly introducing the fuel and combustion fresh air, only the latter scavenges the combustion gases.

The introduction of the fuel is delayed and is performed when the exhaust port is nearly closed to minimize losses from it. Various injection devices have been developed. The applicant has particularly studied a direct injection device with stratified charge making possible a great reduction of the emissions of unburned residues as well as nitrogen oxides.

The natural pollution control produced by the injection of the fuel after closing the exhaust port is still not sufficient to meet the increasingly draconian antipollution laws.

It is therefore necessary to combine catalytic converters with the two-cycle engines.

Unfortunately, the design of two-cycle engines prevents fully using all the pollution control possibilities of the catalytic converters.

Actually, the burnt gases are evacuated mixed with fresh scavenging air, it is therefore impossible to work in a reducing medium and to process the nitrogen oxides or $NO_x$.

SUMMARY OF THE INVENTION

This invention therefore has as an object to reduce the pollution of two-cycle engines beyond the strictest standards in a particularly simple and economical manner.

For this purpose, the invention has as an object a two-cycle engine with fuel injection, of the type comprising at least one cylinder in which a piston is mounted to slide, a crankshaft is connected to this piston and housed in a housing, the cylinder further communicating with an intake circuit placed in the vicinity of the bottom dead center of the piston and with a circuit for exhaust of the combustion gases by at least one exhaust orifice. This engine is characterized in that said exhaust circuit comes out in the cylinder by at least two exhaust orifices: a first orifice placed approximately at the level of said intake orifice and a second orifice placed above the first.

According to another characteristic of the invention, said second orifice is placed in the upper part of the cylinder.

Thanks to this arrangement, the piston in its downward travel first uncovers said second exhaust orifice well before the fresh scavenging air has invaded the cylinder, which makes it possible to exhaust the very hot burnt gases representative of the combustion and not including the oxygen provided by the scavenging.

According to another characteristic of the invention, said exhaust circiut breaks down into one main exhaust line which is divided into two in the vicinity of the cylinder: a first duct communicating with the cylinder by said first exhaust orifice and a second duct communicating with the cylinder by said second exhaust orifice.

According to another characteristic of the invention, the second duct is equipped, in the vicinity of the second exhaust orifice, with choke means controlled by an actuator as a function of one or more working parameters of the engine.

According to an embodiment of the invention, said choke means consist of a rotary slide valve about which it is possible to conceive that it be disengageable and dephasable.

According to an embodiment of the invention, said second duct is equipped with a trifunctional catalytic, converter.

According to an embodiment of the invention, said exhaust line is equipped with a catalytic oxidation converter.

According to an embodiment of the invention, said second duct is equipped with an oximetric probe connected to the injection computer to optimize the fuel injection.

According to an embodiment of the invention, the dimensions of said first exhaust orifice are greater than those of said second exhaust orifice.

BRIEF DESCRIPTION OF THE DRAWINGS

Other features and advantages of the invention will result also from the following description. In the accompanying drawing, given by way of nonlimiting example, an embodiment of the two-cycle engine according to the invention has been represented.

DETAILED DESCRIPTION OF THE PREFERRED EMBODIMENTS

Figure 1:
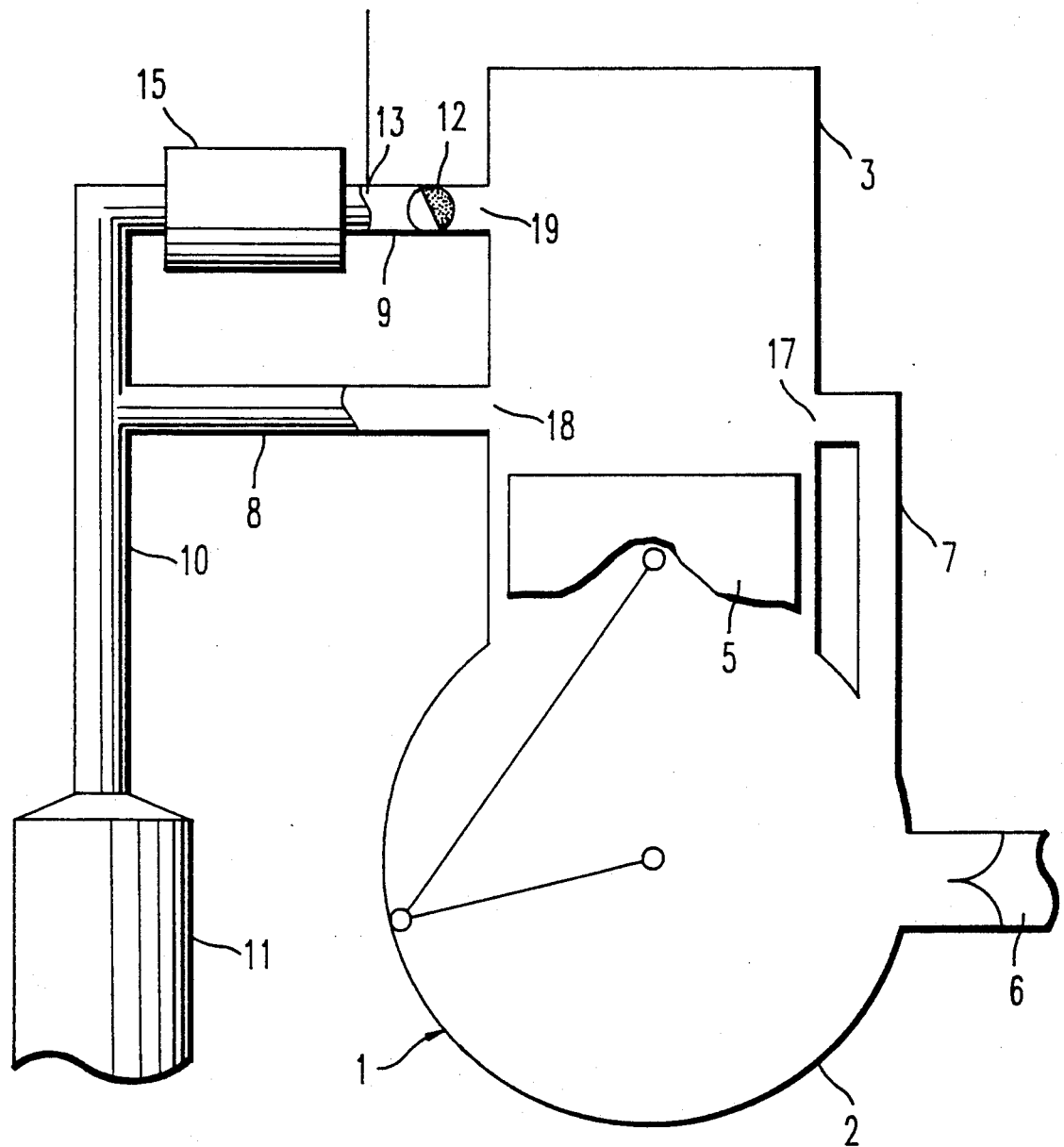
FIG. 1 is a diagrammatic view in partial vertical section of an engine according to the invention.

FIG. 1 represents a two-cycle internal combustion engine, referenced 1, of which only its constituent parts concerning the invention have been represented.

The mobile parts consist mainly of a piston 5, a connecting rod and a crankshaft. The fuel injection is preferably direct and the ignition is obtained by a standard means: electric system with ignition plug. The distribution of combustion air and combustion gas is assured by openings or ports 17, 18, 19 drilled in the frame of cylinder 3. These orifices are opened at an opportune time by the back and forth movement of piston 5 in cylinder 3. A primary intake duct 6, equipped with a flap valve, feeds pump housing 2 with combustion air. A transfer duct 7, which connects the housing to the cylinder and which comes out into the cylinder by intake port 17 is located laterally to the cylinder and exhaust port 18, from where exhaust duct 8 comes out, is located facing the intake port, but with a slight offset. These two orifices of intake 17 and exhaust 18 are placed in the vicinity of the bottom dead center of piston 5. A second exhaust duct 9 communicates with cylinder 3 by opening 19. This opening 19 is placed in the upper part of cylinder 3. Duct 9 works with a choke system that can be actuated, such as, for example, a rotary slide valve 12, controlled as a function of one or more working parameters of engine 1. Duct 9 is equipped, downstream from the choke system, with an oximetric probe 13 and a trifunctional "light off" catalyst 15. Duct 9 then joins, just as duct 8, exhaust line 10 also equipped with a catalytic converter 11. Catalytic converter 11 is preferably of one-bed oxidation catalyst type.

The operation of engine 1 is as follows.

The upward travel of piston 5 creates a vacuum below it in pump housing 2.

The flap valve in primary intake duct 6 opens and a blast of combustion air simultaneously rushes into housing 2, below piston 5.

The combustion air contained in cylinder 3, derived from a preceding pulsation, is compressed, mixed with the injected fuel and ignited at the end of travel by the electric spark.

The downward travel of piston 5 produces in housing 2 a prior compression of the combustion air and drives it back into transfer duct 7. The expansion or driving pulse of the ignited gases occurs above piston 5, the piston first uncovers port 19, which makes possible an optional preexhaust of the combustion gases depending on the position of slide valve 12 (open or closed), then by coming toward the bottom dead center, piston 5 uncovers almost simultaneously the two orifices of intake 17 and exhaust 18. The fresh gases passed into transfer duct 7 come out into cylinder 3 and push the exhaust gases and expanded gases before them so that they escape by exhaust orifices 18 and 19.

The existence of preexhaust circuit 9, 19 has multiple utilities.

It makes it possible in particular during cold starts to evacuate early, during the downward travel of piston 5, a certain amount of burnt gases in the absence of any scavenging air. This preexhaust, carefully controlled by the actuating of slide valve 12, first makes possible the triggering of catalyst 15 thanks to the initial high temperature of the gases, then, by using the release of heat generated by the exothermal reactions of pollution control thus produced, the triggering of catalyst 11.

Thus at the bottom dead center of the piston, the exhaust gases which come in through duct 8, although greatly cooled by the fresh scavenging air, can nevertheless be correctly cleared of pollution by catalytic converter 11.

It is also possible during the operations with large loads and high speeds to promote the pollution control of nitrogen oxides ($NO_x$). By opening port 19 thanks to slide valve 12, during the expansion up to the opening of ports 17 and 18, the burnt gases which escape through duct 9 are all reducing gases, which makes possible the processing of the nitrogen oxides thanks to catalyst 15 preferably selected as trifunctional. Such a processing is impossible when the burnt gases are mixed with the oxygen of the scavenging air.

Further, the oximetric probe placed in duct 9 makes it possible to refine the control of the injection by analyzing the combustion products without being disturbed by the scavenging air. This assembly thus makes possible the adjustment of the injection and thus to optimize the combustion which has the effect of reducing the natural emissions of pollutant products (HC, $NO_x$, CO). Further, the preexhaust makes it possible to reduce the pressure waves which originate in the exhaust line.

Actually, during the opening of port 18, because of the preexhaust performed by the opening of port 19, the pressure which prevails in the cylinder is lower, thus the intensity of the acoustic phenomena which will be propagated in exhaust duct 8 and return to cylinder 3 will be reduced, contributing to disturbing the scavenging less.

On the other hand, by acting on the respective dimensions of ducts 8 and 9, length, section, etc . . . , it is possible to improve considerably the performances of the engine. Thus, by reducing the dimensions of port 18 relative to a standard two-cycle engine exhaust port, the natural pollution control is improved very considerably in particular in intermediate speeds with small loads.

To do this, port 19 is kept closed thanks to rotary slide valve 12, the transfer of the exhaust gases from cylinder 3 to exhaust line 10 then is performed only by port 18 with a small section therefore and a fairly short opening time.

This can replace a system with variable timing whose main characteristic is to make the timing and the effective section of the exhaust port vary simultaneously. It is known that it is necessary to have a permeable exhaust for the performances of full loads at high speed and less permeable at low speed.

Further, the dimensions of port 19 are preferably smaller than those of port 18.

It is obvious that the invention is not limited to the embodiments described and that it is possible to add variant embodiments. Thus, rotary slide valve 12 can be replaced by a valve controlled by a cam or by any other actuating device. Thus, it is possible to use several preexhaust ports for duct 9 and/or duct 8.

We claim:

1. A two stroke engine with fuel injection, comprising:
    at least one cylinder;
    a piston reciprocatingly sliding in said cylinder between a top dead center position and a bottom dead center position;
    an intake circuit terminating in the cylinder at an intake orifice adjacent the bottom dead center position for delivering compressed air to the cylinder;
    an exhaust circuit comprising a first exhaust orifice adjacent the bottom dead center position and a second orifice positioned closer to said top dead center position than said intake orifice and said first exhaust orifice, said exhaust circuit further comprising an exhaust line, a first exhaust duct connecting said first exhaust orifice with said exhaust line and a second exhaust duct connecting said second orifice with said exhaust line; and
    an oxygen sensor in said second exhaust duct.

2. The engine of claim 1 including a three-way catalytic converter in said second exhaust line.

3. The engine of claim 2, wherein said oxygen sensor is upstream of said catalytic converter in a gas flow direction.

4. The engine of claim 3, including a valve in said second exhaust line at a position upstream of said oxygen sensor.

5. The engine of claim 4, wherein said valve comprises a rotary slide valve.

6. The engine of claim 2, including an oxidation catalytic converter in said exhaust line.

7. The engine of claim 1, wherein said first exhaust orifice is larger than said second exhaust orifice.

8. A two stroke engine with fuel injection, comprising:
   at least one cylinder;
   a piston reciprocatably sliding in said cylinder between a top dead center position and a bottom dead center position;
   an intake circuit terminating in the cylinder at an intake orifice adjacent the bottom dead center position for delivering compressed air to the cylinder;
   an exhaust circuit comprising a first exhaust orifice adjacent the bottom dead center position and a second orifice positioned closer to said top dead center position than said intake orifice and said first exhaust orifice, said exhaust circuit further comprising an exhaust line, a first exhaust duct connecting said first exhaust orifice with said exhaust line and a second exhaust duct connecting said second exhaust orifice with said exhaust line;
   a choke device in said second exhaust line, said choke device being controlled by an actuator as a function of at least one engine parameter; and
   a three way catalytic converter in said second exhaust duct at a position downstream of said choke device.

9. The engine of claim 8 wherein said choke device comprises a rotary slide valve.

10. The engine of claim 8 including an oxidation catalytic converter in said exhaust line.

11. The engine of claim 8 including an oxygen sensor in said second exhaust duct.

12. The engine of claim 8 wherein said first exhaust orifice is larger than said second exhaust orifice.

* * * * *